United States Patent [19]

Jung

[11] Patent Number: 5,737,145
[45] Date of Patent: Apr. 7, 1998

[54] METHOD FOR GENERATING INDEX PULSE WITH INDEX PATTERN

[75] Inventor: Kwang-Jo Jung, Suwon, Rep. of Korea

[73] Assignee: Samsung Electronics Co., Ltd., Suwon, Rep. of Korea

[21] Appl. No.: 658,099

[22] Filed: Jun. 4, 1996

[51] Int. Cl.[6] .................................................. G06F 12/00
[52] U.S. Cl. ............................................. 360/77.08; 360/51
[58] Field of Search ............................ 360/77.08, 51, 360/77.05, 77.07, 78.08; 369/58, 32, 48, 47

[56] References Cited

U.S. PATENT DOCUMENTS

| | | | |
|---|---|---|---|
| 4,636,885 | 1/1987 | Yamada et al. | 360/77.08 |
| 5,274,510 | 12/1993 | Susita et al. | 360/77.08 |
| 5,539,795 | 7/1996 | Takase | 360/77.08 |
| 5,596,737 | 1/1997 | Strang, Jr. | 360/77.08 |

*Primary Examiner*—Nabil Hindi
*Attorney, Agent, or Firm*—Jones & Volentine, L.L.P.

[57] ABSTRACT

A method for generating an index pulse with an index pattern in a hard disk drive, is disclosed including the steps of:

(a) reading out and searching for a plurality of index patterns from a magnetic disk which previously stores patterns of sequential correlations in an index pattern domain of a servo domain of one sector;

(b) detecting whether the plurality of index patterns read and searched in the step (a) are sequential;

(c) detecting whether the index pattern is for the first sector, using the sequential correlation of the sectors, if the index patterns are sequential in the step (b); and (d) transmitting an index pulse generating signal to a gate array to thereby generate an index pulse, if the first sector is detected in the step (c).

10 Claims, 3 Drawing Sheets

METHOD FOR GENERATING INDEX PULSE WITH INDEX PATTERN

The subject matter of the present application is related to that in co-pending applications Ser. Nos. 08/653,968, entitled "Method for Detecting Data Stroke for Disk Drive", filed May 28, 1996; 08/656,878, entitled "System and Method for Controlling Spindle Motor for Hard Disk Drive Unit", filed May 30, 1996; 08/657,665, entitled "Servo Information Recording Method for a Magnetic Recording Medium", filed May 31, 1996; 08/659,737, entitled "Data Sector Pulse Generating Method", filed Jun. 6, 1996; 08/661,492, entitled "Servo Sector Forming Method for Fast Detection and Track Address Correcting Method", filed Jun. 11, 1996; 08/676,962, entitled "Sealing Device of Hard Disk Drive"; and 08/661,491, entitled "Method for Determining a Position of Track-Zero and Mapping Tracks According Thereto", filed Jun. 11, 1996, incorporated herein by reference.

FIELD OF THE INVENTION

The present invention relates to a hard disk drive, and more particularly, to a method of generating an index pulse.

BACKGROUND OF THE INVENTION

An index pulse of a hard disk drive is a pulse indicative of a first sector of one track on a magnetic disk. When a format command is performed by a disk controller, formatting is performed the reference to this pulse. The index pulse may also be used to indicate time-out of a command performance. When using a zone bit recording technique, the pulse may also be used as a reference for generating a data sector pulse, as different numbers of data sectors may be used for each zone.

The beginning of the first sector of each track is placed on the same line on a magnetic disk. In order to distinguish each of the first sectors, an index pulse is used. During a servo write, an index pattern is previously written on servo information in order to generate the index pulse. FIG. 1 is a diagram illustrating tracks, sectors and the generation position of the index pulse on a magnetic disk.

A plurality of concentric tracks may exist on a magnetic disk. The tracks are divided in units of sectors, and the number of sectors for one track may be determined by the characteristics of a hard disk drive. Each track may be divided into servo and data domains. Physical position information of the sector may be previously written on the servo domain. The data domain may be used to write or read data.

FIG. 2 is a diagram illustrating an enlarged servo domain of FIG. 1. The servo domain is made up of a servo sync, servo address mark (SAM), index pattern, gray code, and bursts. The servo sync, the beginning of the servo domain, is a domain for searching for the SAM. The SAM uses a special pattern which is not produced in the data section. Timing of the servo sector is taken as a reference with the time to detect SAM. The servo header contains information indicative of track position on the disk. The burst signal is indicative of position of the head within a track. The index pattern is made to generate the index pulse.

FIG. 3 is a block diagram of a conventional sector pulse generator, which comprises magnetic head 10, read/write processor 12, gate array 14, and disk controller 16. Magnetic head 10 reads coded data stored on a magnetic disk. Read/write processor 12 receives data read by magnetic head 10. Read/write processor 12 amplifies and decodes the read data. The index pattern read by magnetic head 12 is transmitted to gate array 14. Gate array 14 receives and decodes the index pattern. If the decoded index pattern is for a first sector, gate array 14 generates and transmits an index pattern to disk controller 16.

During a servo write, the index pattern of the first sector is usually written as information which is different from what is written for the index patterns of other sectors. For instance, the index pattern of the first sector is written with 1, and the index patterns of other sectors with 0. In this case, gate array 14 decodes the index pattern, and generates an index pulse in case of 1.

In a conventional sector pulse generating method, information written in the index pattern may be composed of one or two bits such that the first sector may be distinguished from other sectors with a different index pattern. However, other sectors may not be discriminated only by their index patterns. If a normal index pattern is destroyed due to defects on the disk, noise or other problems, or decoding is performed incorrectly, the index pulse may not be correctly generated for the first sector. In some instances, another pulse may be produced in other sectors but not in the first sector.

SUMMARY OF THE INVENTION

Therefore, it is an object of the present invention to provide a method for generating an index pulse with an index pattern in which an index pattern is interpreted to generate an index pulse and sector numbers are counted.

To accomplish the object of the present invention, there is provided a method for generating an index pulse with an index pattern in a hard disk drive. The method comprises the steps of:

(a) reading out and searching for a plurality of index patterns from a magnetic disk which previously stores patterns of sequential correlations in an index pattern domain of a servo domain of one sector;

(b) detecting whether the plurality of index patterns read and searched in the step (a) are sequential;

(c) detecting whether the index pattern is for the first sector, using the sequential correlation of the sectors, if the index patterns are sequential in the step (b); and (d) transmitting an index pulse generating signal to a gate array to thereby generate an index pulse, if the first sector is detected in the step (c).

BRIEF DESCRIPTIONS OF THE DRAWINGS

DETAILED DESCRIPTION OF THE INVENTION

Hereinafter, a preferred embodiment of the present invention will be described with reference to the attached drawings. In the following description, it should be noted that like components are indicated by like numerals whenever possible. Other details of the description and drawings are provided for deeper understanding of the present invention. It would be obvious to skilled persons in the art that the present invention can be implemented without such details. Well-known prior art features have been omitted for the sake of clarity.

Figure 1:
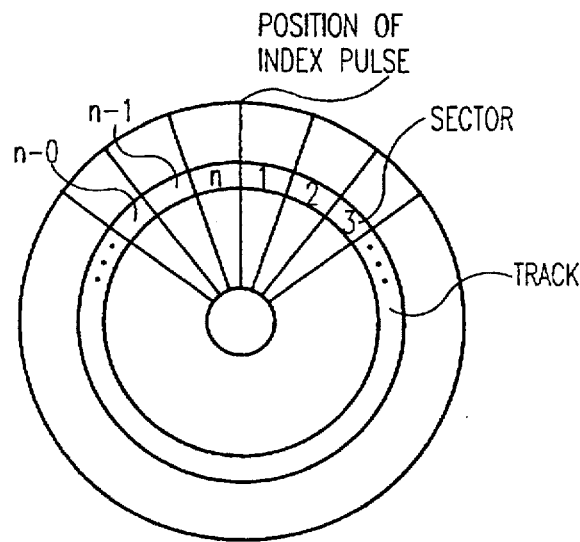
FIG. 1 is a diagram illustrating tracks, sectors and the generation position of an index pulse on a magnetic disk.
Figure 2:
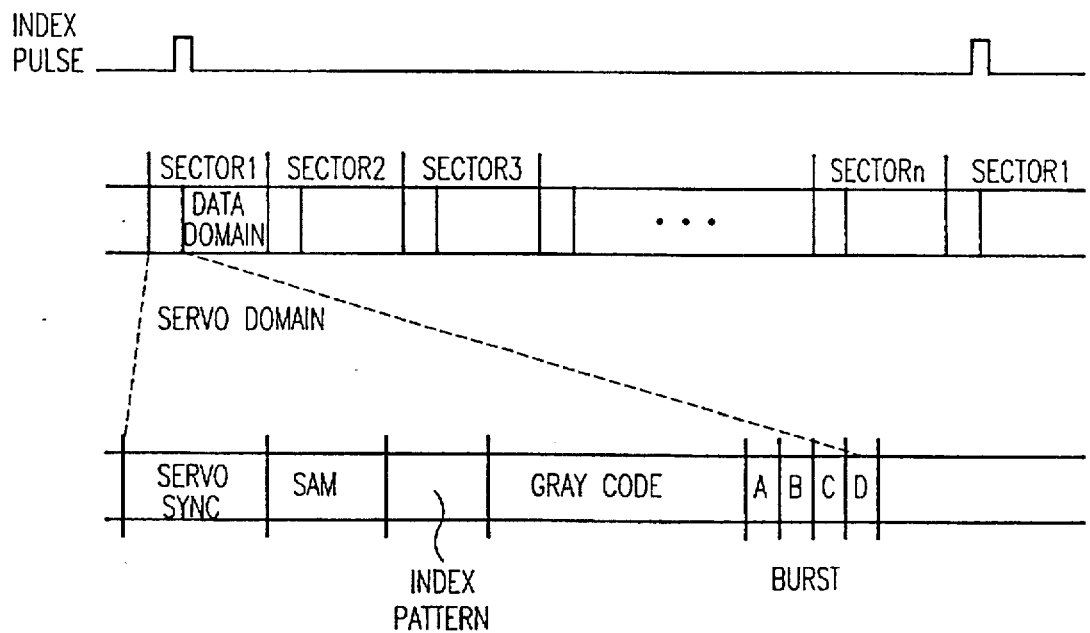
FIG. 2 is a diagram illustrating the structure of the sectors and servo domain on the magnetic disk in detail.
Figure 3:
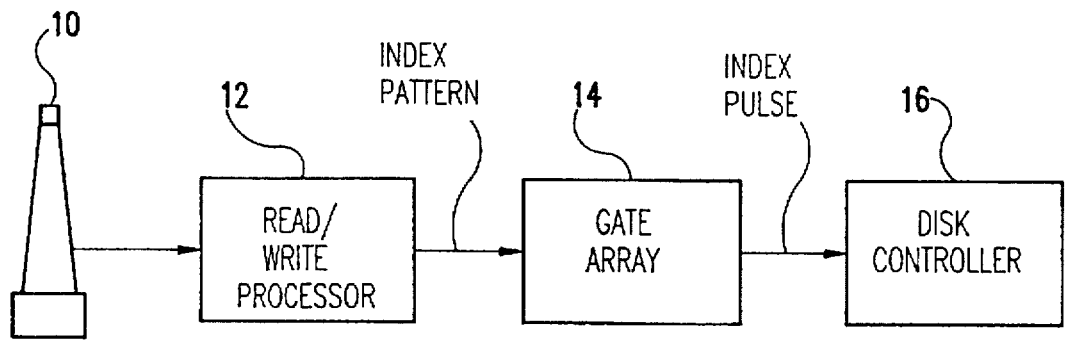
FIG. 3 is a block diagram of a conventional index pulse generator.
Figure 4:
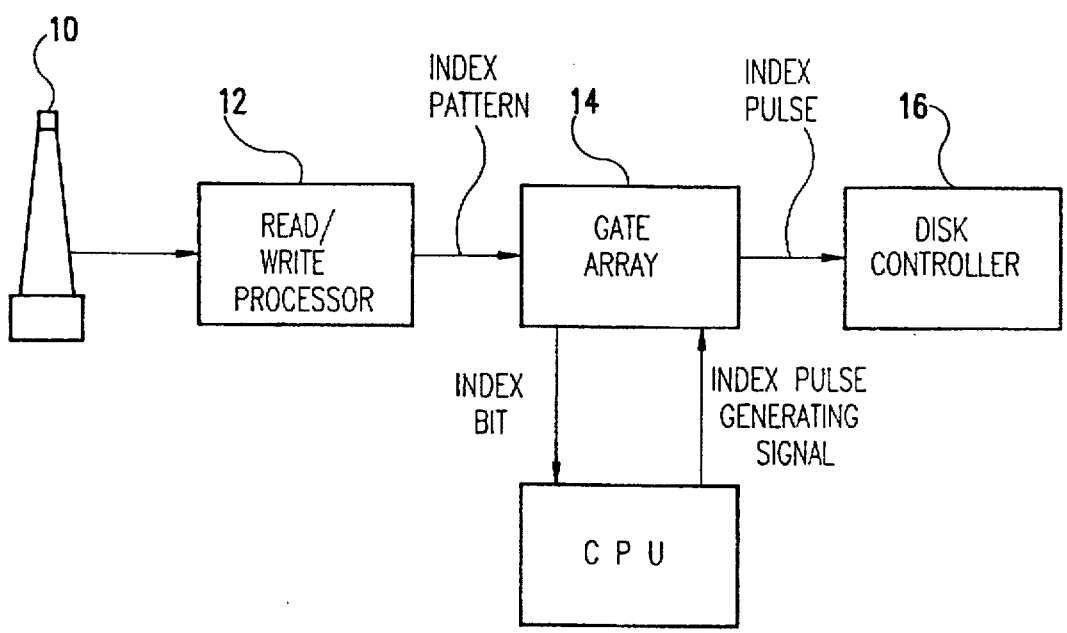
FIG. 4 is a block diagram of an index pulse generator of the present invention.
Figure 5:
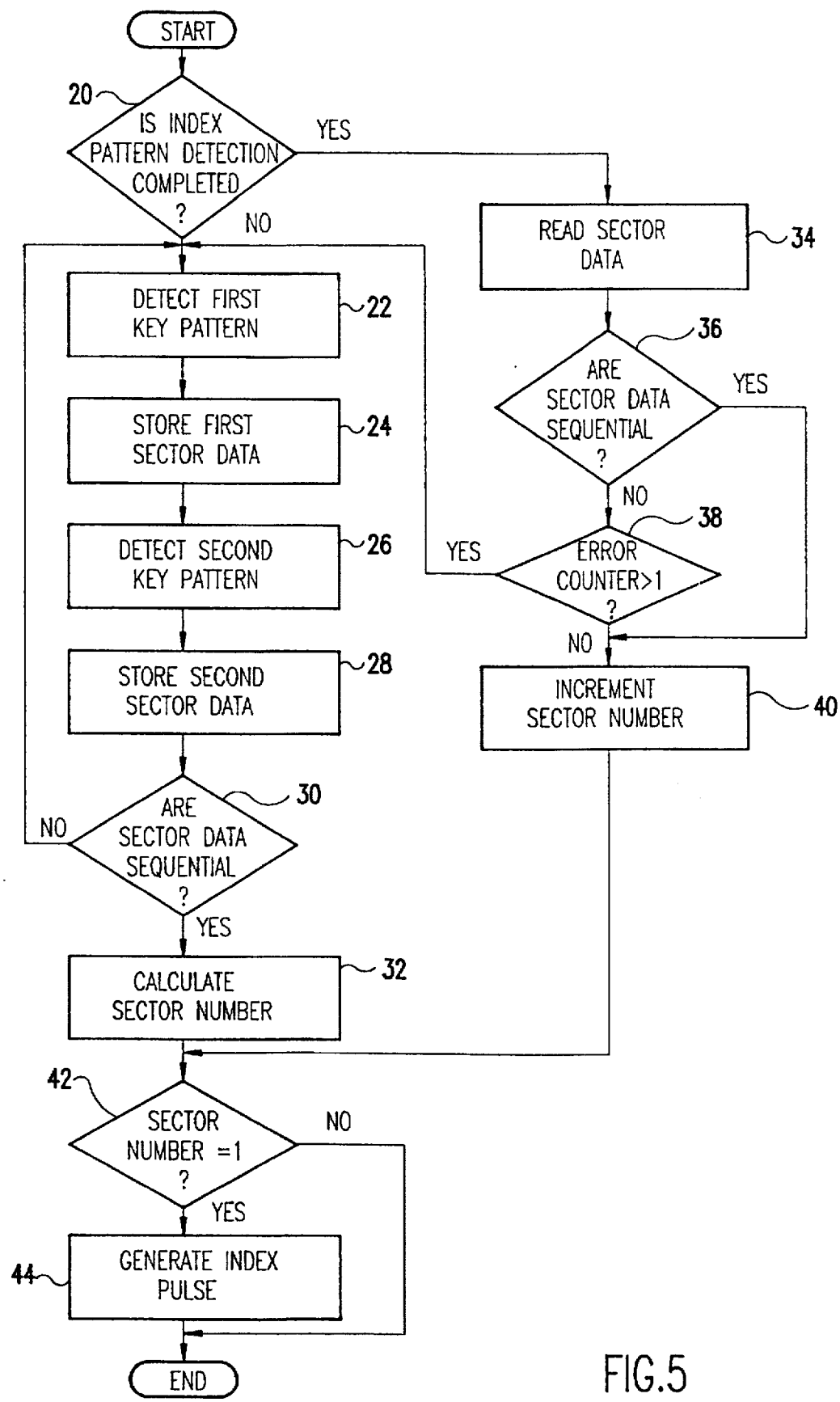
FIG. 5 is a flowchart of an index pulse generating method of the present invention.

FIG. 4 is a block diagram of an index generator of the present invention. FIG. 5 is a flowchart of an index pulse generating method of the present invention. The index pulse generator and generating method of the present invention will be described in detail with reference to FIGS. 1, 2, 4 and 5.

In this embodiment of the present invention, a magnetic disk of 80 sectors in one track is used. One sector of the magnetic disk includes servo and data domains. The servo domain comprises a servo sync domain, servo address mark domain, index pattern domain, servo header domain, and burst domain. An index pattern is recorded in the index pattern domain. The index pattern comprises information for generating an index pulse. In the preferred embodiment of the present invention, one track may have a plurality of sectors. The index patterns of each sector form a plurality of index groups. These index groups are illustrated in TABLE 1.

TABLE 1

| | | | | | | | | |
|---|---|---|---|---|---|---|---|---|
| 1st index group | 1 | 1 | 1 | 0 | 0 | 0 | 0 | 1 |
| 2nd index group | 1 | 1 | 1 | 0 | 0 | 0 | 1 | 0 |
| 3rd index group | 1 | 1 | 1 | 0 | 0 | 0 | 1 | 1 |
| 4th index group | 1 | 1 | 1 | 0 | 0 | 1 | 0 | 0 |
| 5th index group | 1 | 1 | 1 | 0 | 0 | 1 | 0 | 1 |
| 6th index group | 1 | 1 | 1 | 0 | 0 | 1 | 1 | 0 |
| 7th index group | 1 | 1 | 1 | 0 | 0 | 1 | 1 | 1 |
| 8th index group | 1 | 1 | 1 | 0 | 1 | 0 | 0 | 0 |
| 9th index group | 1 | 1 | 1 | 0 | 1 | 0 | 0 | 1 |
| 10th index group | 1 | 1 | 1 | 0 | 1 | 0 | 1 | 0 |

In a servo write, index patterns previously written correspond to an index group for every sector number. Each index pattern is made up with one bit. The index bits of eight sectors form ten index groups in the example where one track is composed of 80 sectors. The higher four bits of the index groups may be called the key pattern, whereas the lower four bits may be referred to as the sector data and the value of each of index group.

In the present example, the key pattern of the first index group is 1110, and the first sector data is 0001. The key pattern may have the same value in the same track. The sector data may be incremented by 1 whenever the index groups advance by one. The binary value of the first sector data of the first index group is 0001, and its decimal value is 1. The binary value of the second sector data of the second index group is 0010, and its decimal value is 2. The sector data of other index groups may also be incremented by 1 sequentially.

When magnetic head 10 moves to the data domain from the parking domain of the magnetic disk, CPU 18 detects the index pattern. Magnetic head 10 reads out the index pattern from the magnetic disk. The read index pattern is transmitted to read/write processor 12, which receives and transmits the index pattern to gate array 14. Gate array 14 decodes and stores the index pattern to the index bit register.

In step 20, CPU 18 detects whether index pattern searching is performed. CPU 18 performs step 22 when it does not perform index pattern searching. If index pattern searching is performed, step 34 is performed. In step 22, CPU 18 reads out the index pattern stored in the index bit register. CPU 18 detects whether an index pattern for the key pattern is present in the index patterns read. If so, CPU performs step 24.

In step 24, CPU 18 reads out the sector data stored after the key pattern detected, and stores the read data in the memory of CPU 18. Here, the sector data stored is called first sector data. If storage of the first sector data is completed, CPU 18 performs step 26. In step 26, CPU 18 reads out the index pattern stored after the sector data read in step 22 from the index bit register. CPU 18 detects whether the index pattern for the key pattern is present in the read index patterns. If the detection of the key pattern is finished, CPU 18 performs step 28.

In step 28, CPU 18 reads out sector data stored after the detected key pattern, and stores it in the memory of CPU 18. Here, stored sector data may be referred to as second sector data. If storage of second sector data is completed, CPU 18 performs step 30. In step 30, CPU 18 subtracts first sector data from second sector data. CPU 18 detects whether the subtracted value is 1 or not. The sector data is incremented by 1 for every index group. If the subtracted value is 1, the sector data of the two groups are sequential. If so, CPU 18 performs step 32, and if not, step 22.

In step 32, CPU 18 calculates sector numbers. Here, the calculation of the sector numbers are as follows. For instance, if the first index group is the third index group, and the second group is the fourth index group, the current sector number is a value in which the sector data of the second group is multiplied by 8. Here, 8 is multiplied because one group is made up with eight index patterns.

If the calculation of the current sector number is finished, CPU 18 stores the current sector number in the current sector register. If the storage of the current sector number is finished, CPU 18 performs step 42. In step 42, CPU 18 detects whether sector data stored in the current sector register is 1 or not. Here, this is because the index pulse must be generated from the first sector. If the stored sector number is 1, step 44 is performed. If not, the flowchart ends.

In step 44, CPU 18 sets the ENINDEX flag of gate array 14. The ENINDEX flag is made to generate an index pulse from gate array 14. Gate array 14 generates an index pulse when the ENINDEX flag is set.

Because the index searching is finished in step 34, the index bit register stores the first and second sector data. CPU 18 reads out the first sector data. If the reading of the data is completed, CPU 18 performs step 36. In step 36, CPU 18 reads out the current sector data stored in the current sector register. CPU 18 increments the read first sector data by 1, and multiplies it by 8. Then, it is detected whether the current data and the sector number calculated from the first sector data are identical. If they are the same, the two kinds of sector data are meant to be different by 1 and sequential.

If the two kinds of sector data are sequential, step 40 is performed, and if not, step 38 is performed. In step 38, CPU 18 increments the error counter by 1. If the error counter surpasses 1, CPU 18 re-performs step 22 in order to search for the index patterns. The detection of index pattern is not performed again if the counter does not surpass 1, but in case the error is generated over twice.

In step 40, CPU 18 increments the current sector number by 16. Here, the index value incremented by 16 becomes the sector number of the second index group. This incremented sector number is stored in the current sector register. If storage of the current sector number is completed, CPU 18 performs step 42.

As described above, in this invention, the sector numbers can be calculated in combination with index patterns after index patterns of multiple sectors are detected so that the index pulse can be generated from the first sector even when a normal index pattern is damaged due to the defects of magnetic disk, noise or other reasons, or decoding is performed incorrectly.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

While the preferred embodiment and various alternative embodiments of the invention have been disclosed and described herein, it may be apparent to those skilled in the art which various changes in form and detail may be made without departing from the spirit and scope of the invention.

What is claimed is:

1. A method for generating an index pulse with an index pattern in a hard disk drive, said method comprising the steps of:
    (a) reading out and searching for a plurality of index patterns from a magnetic disk which previously stores patterns of sequential correlations in an index pattern domain of a servo domain of one sector;
    (b) detecting whether the plurality of index patterns read and searched in said step (a) are sequential;
    (c) detecting whether said index pattern is for a first sector, using the sequential correlation of said sectors, if said index patterns are sequential in said step (b); and
    (d) transmitting an index pulse generating signal to a gate array to thereby generate an index pulse, if the first sector is detected in said step (c).

2. A method for generating an index pulse with an index pattern, as claimed in claim 1, wherein the index pattern stored in the magnetic disk is made so that a key pattern indicative of track is stored in the first sector and the index pattern domains of following multiple sectors, sector data indicative of sector is stored in the index domains of the following sectors of the sector where the key pattern is stored, said sector data being sequential, such that the first sector data is taken as 1, the second sector data is 2, and the third sector data is 3, said sector data is binary so that a plurality of index bits form one kind of sector data, said magnetic disk storing the key pattern and sector data with respect to all the sectors.

3. A method for generating an index pulse with an index pattern, as claimed in claim 1, wherein said step (a) comprises the steps of:
    (1) for a magnetic head, reading a plurality of index patterns on a magnetic disk and storing them in a register, and, for a CPU, reading the index pattern stored in said register and detecting a key pattern;
    (2) reading the index pattern after the key pattern detected in the step (1), and detecting and storing sector data in a memory;
    (3) reading the index pattern after the sector data stored in the step (2), and detecting a key pattern; and
    (4) reading the index pattern after the key pattern detected in the step (3), and detecting and storing sector data in the memory.

4. The method for generating an index pulse with an index pattern, as claimed in claim 3, wherein said step (b) comprises the step of:
    deducting the two kinds of sector data stored in said steps (2) and (4) if the storage of sector data is finished in said step (4), and detecting whether they are sequential.

5. A method for generating an index pulse with an index pattern, as claimed in claim 4, further comprising the steps of:
    deciding whether the detection of index pattern is performed, and if not, performing said step (2);
    reading sector data stored in said step (4), and deciding whether the sector data and data stored when the detected index pattern is performed are sequential;
    incrementing an error counter if the two kinds of data are not sequential, and performing said step (1) if the error counter is above a predetermined value; and
    re-performing said step (c) if the error counter is below a predetermined value.

6. A hard disk drive comprising:
    a magnetic disk;
    a read/write head for recording and reading sector data and user data to and from said magnetic disk; and
    a controller, coupled to said read/write head, for controlling recording and reading of sector data and user data to and from said magnetic disk, said controller comprising:
    first means, for reading out and searching for a plurality of index patterns from a magnetic disk which previously stores patterns of sequential correlations in an index pattern domain of a servo domain of one sector;
    second means, coupled to said first means, for detecting whether the plurality of index patterns read and searched by said first means are sequential;
    third means, coupled to said first and second means, for detecting whether said index pattern is for a first sector, using a sequential correlation of said sectors if said index patterns are determined sequential by said second means; and
    a gate array, coupled to said first means, said second means, and said third means, for receiving an index pulse generating signal and for generating an index pulse, if the first sector is detected by said third means.

7. The hard disk drive of claim 6, wherein the index pattern stored in the magnetic disk is made so that a key pattern indicative of track is stored in the first sector and the index pattern domains of following multiple sectors, sector data indicative of sector is stored in the index domains of the following sectors of the sector where the key pattern is stored, said sector data being sequential, such that the first sector data is taken as 1, the second sector data is 2, and the third sector data is 3, said sector data is binary so that a plurality of index bits form one kind of sector data, said magnetic disk storing the key pattern and sector data with respect to all the sectors.

8. The hard disk drive of claim 7, wherein said first means further comprises:
    fourth means for reading a plurality of index patterns on a magnetic disk from the read/write head;
    a register coupled to said fourth means, for receiving and storing the plurality of index patterns;
    a memory for storing sector data; and
    a processor, coupled to the register and the memory, for reading the index pattern stored in said register and detecting a key pattern, reading the index pattern after the key pattern is detected, and outputting sector data, reading the index pattern after the sector data is stored in the memory and detecting a key pattern, reading the index pattern after the key pattern is detected from sector data stored in the memory, and detecting and storing sector data in the memory.

9. The hard disk drive of claim 8 wherein said processor further compares two kinds of sector data stored in said memory and detects whether the two kinds of sector data are sequential.

10. The hard disk drive of claim 9, wherein said processor further decides whether detection of index pattern is performed, and if not, reads the index pattern after the key pattern is detected and detects and stores sector data in the memory, reads sector data stored in the memory and decides whether the sector data and data stored when the detected index pattern is performed are sequential, said processor further comprising an error counter, incremented by said processor if the two kinds of data are not sequential, wherein said processor reads the index pattern stored in said register and detecting a key pattern if the error counter is above a predetermined value and detects whether said index pattern is for a first sector, using the sequential correlation of said sectors if the error counter is below a predetermined value.

* * * * *